US009001538B2

(12) United States Patent
Hosotani (10) Patent No.: US 9,001,538 B2
(45) Date of Patent: Apr. 7, 2015

(54) SWITCHING POWER SUPPLY APPARATUS (71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/860,719

(22) Filed: Apr. 11, 2013

(65) Prior Publication Data
US 2013/0272031 A1    Oct. 17, 2013

(30) Foreign Application Priority Data
Apr. 12, 2012  (JP) .................................. 2012-091387

(51) Int. Cl.
H02M 1/34 (2007.01)
H02M 3/335 (2006.01)

(52) U.S. Cl.
CPC ............ H02M 3/33569 (2013.01); H02M 1/34 (2013.01); *H02M 2001/346* (2013.01); *Y02B 70/1491* (2013.01)

(58) Field of Classification Search
USPC ............... 363/16, 20–21.18, 56.11, 56.12, 90
See application file for complete search history.

(56) References Cited

U.S. PATENT DOCUMENTS

| 4,740,881 | A | * | 4/1988 | Park et al. ...................... 363/138 |
| 5,708,571 | A | * | 1/1998 | Shinada ........................... 363/16 |
| 6,141,224 | A | * | 10/2000 | Xia et al. ..................... 363/21.06 |
| 6,498,735 | B2 | * | 12/2002 | Hosotani et al. ............ 363/21.15 |
| 6,563,720 | B2 | * | 5/2003 | Kitano ........................ 363/21.15 |
| 7,218,534 | B2 | * | 5/2007 | Yasumura ................... 363/21.06 |
| 7,313,003 | B2 | * | 12/2007 | Nakahori et al. ................ 363/17 |
| 7,847,662 | B2 | * | 12/2010 | Saito et al. ....................... 336/96 |
| 2002/0044459 | A1 | | 4/2002 | Tsubota et al. |
| 2002/0101742 | A1 | | 8/2002 | Hosotani et al. |
| 2002/0110003 | A1 | | 8/2002 | Hosotani et al. |
| 2010/0085778 | A1 | | 4/2010 | Saito et al. |

FOREIGN PATENT DOCUMENTS

JP  61-280769 A  12/1986
JP  08-051777 A  2/1996

(Continued)

OTHER PUBLICATIONS

Official Communication issued in corresponding Japanese Patent Application No. 2012-091387, mailed on Feb. 12, 2014.

*Primary Examiner* — Jessica Han
(74) *Attorney, Agent, or Firm* — Keating & Bennett, LLP (57) ABSTRACT

A transformer that realizes ZVS operation includes a primary winding and a secondary winding. A control circuit turns switching elements on and off in a complimentary manner in order to repeatedly invert the voltage applied to the primary winding. A conduction path supplies a voltage excited in the secondary winding to a load connected between a high-potential side and a ground side of the secondary winding. A first rectifier diode has a rectification direction extending from the high-potential side toward the ground side of the load and is provided along the conduction path. A second rectifier diode and a capacitor, which are connected in series with each other, are connected in parallel with the secondary winding. An inductor is connected in parallel with the second rectifier diode. A rectification direction of the second rectifier diode matches the direction extending from the high-potential side to the ground side.

20 Claims, 7 Drawing Sheets

(56) References Cited

FOREIGN PATENT DOCUMENTS

| JP | 2001-008447 A | 1/2001 |
| JP | 2002-112544 A | 4/2002 |
| JP | 2002-262570 A | 9/2002 |
| JP | 2003-009527 A | 1/2003 |
| JP | 2006-211880 A | 8/2006 |
| JP | 2006-296090 A | 10/2006 |
| JP | 4231767 B2 | 3/2009 |
| JP | 2011-004469 A | 1/2011 |
| WO | 2008/132810 A1 | 11/2008 |

* cited by examiner

FROM TIME t2 TO TIME t3: IMMEDIATELY BEFORE
Ds ENTERS A CONDUCTIVE STATE

FIG. 3B

FROM TIME t6 TO TIME t7: IMMEDIATELY AFTER Ds
ENTERS A NON-CONDUCTIVE STATE

FIG. 7

SWITCHING POWER SUPPLY APPARATUS

BACKGROUND OF THE INVENTION

1. Field of the Invention

The present invention relates to switching power supply apparatuses and, in particular, relates to switching power supply apparatuses that repeatedly invert a voltage applied to a primary side of a transformer by using switching elements and supply a voltage excited in a secondary side of the transformer to a load via a rectifier diode.

2. Description of the Related Art

An example of a conventional switching power supply apparatus is disclosed in Japanese Unexamined Patent Application Publication No. 8-51777. In Japanese Unexamined Patent Application Publication No. 8-51777, a diode and a capacitor, which are connected in series with each other, are connected in parallel with a feedback winding of a transformer and a resistor is connected in parallel with the capacitor. Here, the cathode of the diode is connected to one end of the feedback winding and the anode of the diode is connected to the capacitor. The thus-connected diode, capacitor, and resistor form a snubber circuit and a surge voltage that arises in the feedback winding due to ringing is suppressed by the snubber circuit.

However, in this example of the background art, there is a problem in that energy absorbed by the capacitor in order to suppress the surge voltage is accumulated as charge and then consumed by the resistor and therefore electrical power loss is large.

SUMMARY OF THE INVENTION

Accordingly, preferred embodiments of the present invention provide a switching power supply apparatus that is capable of suppressing a surge voltage while reducing electrical power loss.

A switching power supply apparatus according to a preferred embodiment of the present invention includes a transformer including a primary winding and a secondary winding, a switching unit that repeatedly inverts a voltage applied to the primary winding, a conduction path that supplies a voltage excited in the secondary winding due to operation of the switching unit to a load that is connected between a high-potential side and a ground side of the secondary winding, and a first rectifier element that has a rectification direction extending from a high-potential side toward a ground side of the load and that is provided along the conduction path. In addition, a second rectifier element and a first capacitor, which are connected in series with each other, are connected in parallel with the secondary winding. The second rectifier element has a rectification direction extending from the high-potential side toward the ground side, and a resistance and/or an inductive impedance is connected in parallel with the second rectifier element.

It is preferable that the switching unit include a first switching element connected in series with the primary winding, a second switching element, and a first capacitor, which define a series circuit connected in parallel with the primary winding, and a control unit that turns the first switching element and the second switching element on and off in a complimentary manner with a dead time between on periods of the first and second switching elements.

It is preferable that the switching unit include a first switching element connected in series with the primary winding, a second switching element connected in parallel with the primary winding, and a control unit that turns the first switching element and the second switching element on and off in a complimentary manner with a dead time between on periods of the first and second switching elements.

It is also preferable that the control unit turn the first switching element and/or the second switching element on and off using a ZVS scheme.

It is preferable that the control unit adopt a continuous current mode in which a current flowing to the transformer is continuous.

It is preferable that a ferrite bead or an amorphous bead be adopted as the inductive impedance.

It is preferable that the transformer adopt a flyback scheme or a forward scheme.

It is preferable that an FET be used as the first rectifier element.

According to various preferred embodiments of the present invention, a surge voltage is suppressed while electrical power loss is reduced by accumulating charge in, and then discharging the charge from, a first capacitor.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2A-2H are timing charts of example waveforms in accordance with a preferred embodiment of the present invention, wherein

FIGS. 3A and 3B illustrate a configuration of a preferred embodiment of the present invention, wherein

DETAILED DESCRIPTION OF THE PREFERRED EMBODIMENTS

Figure 1:
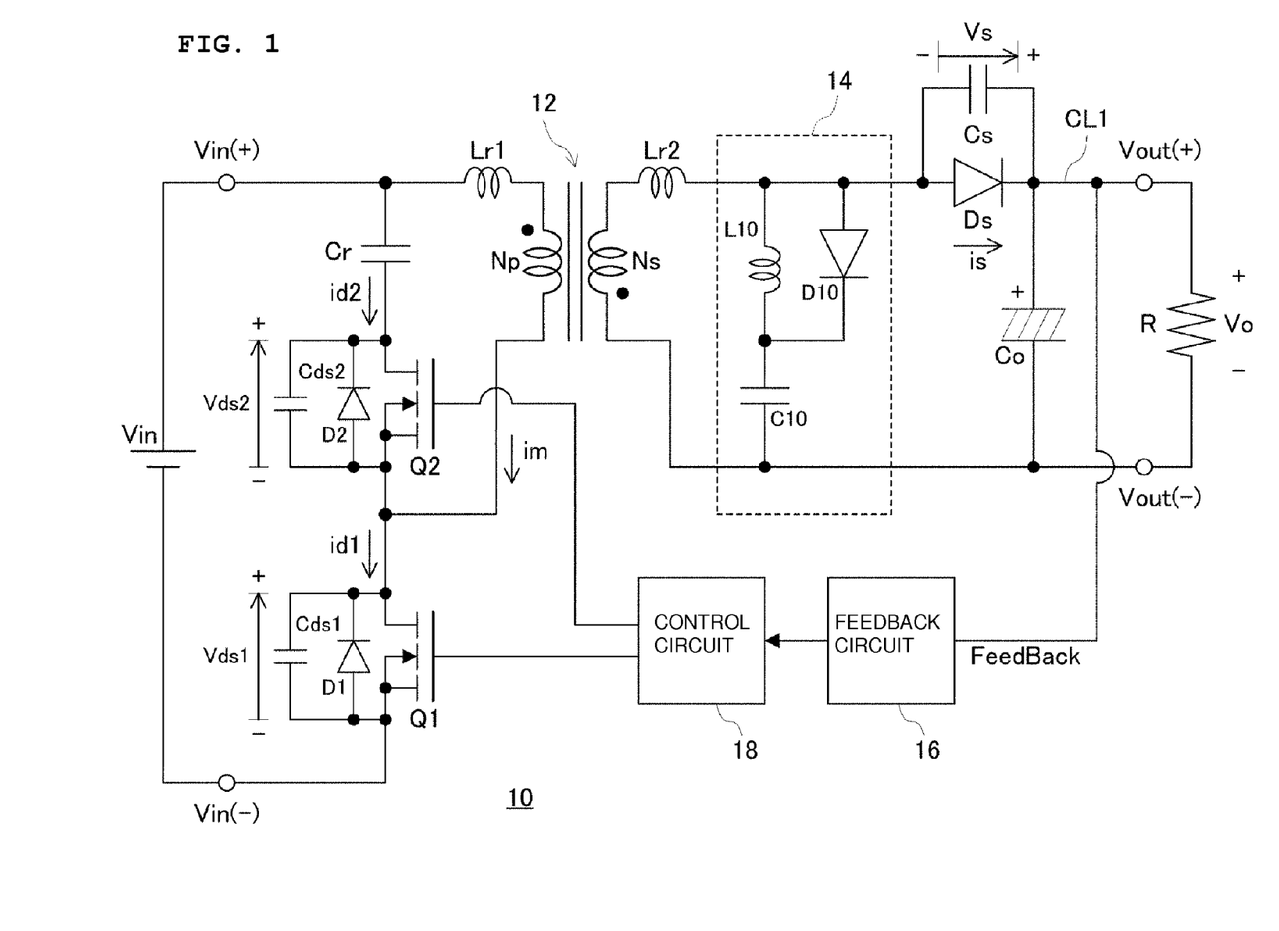
FIG. 1 is a block diagram illustrating a configuration of a preferred embodiment of the present invention.

Preferred embodiments of the present invention will now be discussed with reference to the accompanying drawings. Referring to FIG. 1, a switching power supply apparatus 10 of a preferred embodiment of the present invention includes a transformer 12 including a primary winding Np and a secondary winding Ns, which are magnetically coupled with each other. One end of the primary winding Np is connected to a positive terminal Vin(+) of a direct current power supply Vin and the other end of the primary winding Np is connected to a negative terminal Vin(−) of the direct current power supply Vin via a switching element Q1. More specifically, the switching element Q1 preferably is a Field Effect Transistor (FET) and the other end of the primary winding Np is connected to the drain of the switching element Q1 and the negative terminal Vin(−) of the direct current power supply Vin is connected to the source of the switching element Q1.

A capacitor Cr and a switching element Q2, which are connected in series with each other, are preferably connected in parallel with the primary winding Np. More specifically, the switching element Q2 is also an FET and one end of the capacitor Cr is connected to the one end of the primary winding Np, the drain of the switching element Q2 is connected to the other end of the capacitor Cr, and the other end of the primary winding Np is connected to the source of the switching element Q2.

One end of the secondary winding Ns is a high potential side and is preferably connected to one end of a smoothing capacitor Co and an output terminal Vout(+) via a rectifier diode Ds. The output terminal Vout(+) is connected to one end of a load R. In contrast, the other end of the secondary winding Ns is a ground side and is preferably connected to the other end of the smoothing capacitor Co and an output terminal Vout(−). The output terminal Vout(−) is connected to the other end of the load R. The one end of the load R is a high potential side and the other end of the load R is a ground side. In addition, if a path that connects the one end of the secondary winding Ns and the output terminal Vout(+) is defined as a conduction path CL1, the rectifier diode Ds has a rectification direction extending from the high potential side of the load R toward the ground side and is provided along the conduction path CL1. In other words, the anode of the rectifier diode Ds is connected to the one end of the secondary winding Ns and the cathode of the rectifier diode Ds is connected to the output terminal Vout(+).

A rectifier diode D10 and a capacitor C10, which are connected in series with each other, are preferably connected in parallel with the secondary winding Ns. Specifically, the one end of the secondary winding Ns is connected to the anode of the rectifier diode D10 and the cathode of the rectifier diode D10 is connected to one end of the capacitor C10 and the other end of the capacitor C10 is connected to the other end of the secondary winding Ns. That is, the rectification direction of the rectifier diode D10 is from the high potential side toward the ground side. In addition, an inductor L10 is preferably connected in parallel with the rectifier diode D10. A snubber circuit 14 is defined by the thus-connected rectifier diode D10, the capacitor C10, and the inductor L10.

A control circuit 18 is arranged and programmed to control the switching element Q1 and the switching element Q2 on the basis of output feedback. A feedback circuit 16 is preferably provided between the output terminals Vout(+) and Vout(−) and the control circuit 18. An isolator is provided in the feedback circuit 16, for example, a photocoupler or a pulse transformer can be used. Specifically, a feedback signal is generated by comparing the fractional voltage value of the direct current voltage Vo dropped across the output terminals Vout(+) and Vout(−) and a reference voltage, and a feedback voltage is input to the control circuit 18 in an isolated state. The lower the direct current voltage Vo is, the higher this feedback voltage is.

Figure 2A:
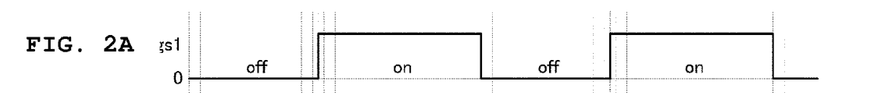
FIG. 2A is a timing chart illustrating an example of a control signal of a switching element Q1.
Figure 2B:
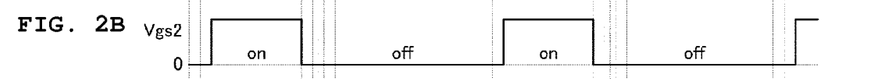
FIG. 2B is a timing chart illustrating an example of changing of a control signal of a switching element Q2.
Figure 2C:
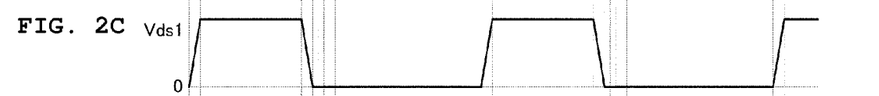
FIG. 2C is a waveform diagram illustrating an example of changing of a drain-source voltage of the switching element Q1.
Figure 2D:
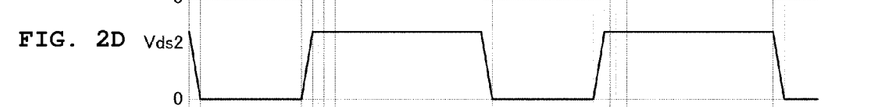
FIG. 2D is a waveform diagram illustrating an example of changing of a drain-source voltage of the switching element Q2.
Figure 2E:
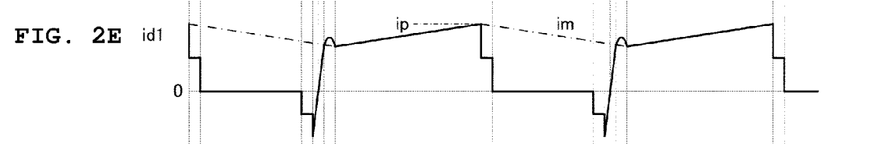
FIG. 2E is a waveform diagram illustrating an example of changing of a drain current flowing through the switching element Q1.
Figure 2F:
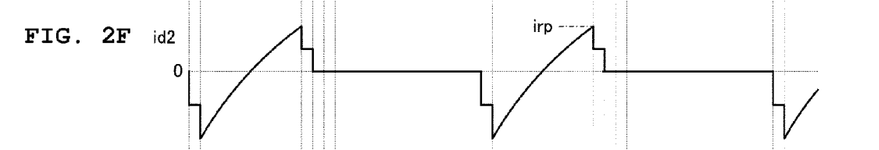
FIG. 2F is a waveform diagram illustrating an example of changing of a drain current flowing through the switching element Q2.
Figure 2G:
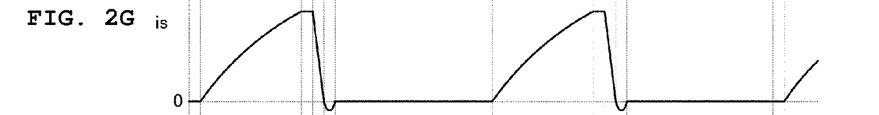
FIG. 2G is a waveform diagram illustrating an example of changing of a current flowing through a rectifier diode Ds and FIG. 2H is a waveform diagram illustrating changing of a terminal voltage of the rectifier diode Ds.

The switching elements Q1 and Q2 are preferably turned on and off as illustrated in FIG. 2A and FIG. 2B with a time period T being a switching period. In FIG. 2A and FIG. 2B, the switching elements Q1 and Q2 are switched on and off in a complimentary manner with a dead time between their on periods.

As illustrated in FIGS. 2A to 2H, operation in each of a plurality of states is illustrated, where control signals of the switching elements Q1 and Q2 are denoted by Vgs1 and Vgs2, the drain-source voltages of the switching elements Q1 and Q2 are denoted by Vds1 and Vds2, the drain currents of the switching elements Q1 and Q2 are denoted by id1 and id2, the current of the secondary side diode Ds is denoted by is and the voltage of the diode Ds is denoted by Vs.

(1) State 1 [t1 to t2]

The switching element Q1 is in a conductive state, an input voltage Vi is applied to the primary winding Np and the transformer 12 is magnetically excited. At time t2, the switching element Q1 is turned off.

(2) State 2 [t2 to t3]

On the primary side, a capacitor Cds1 is charged and a capacitor Cds2 is discharged as a result of a current that flows due to a magnetically excited inductance L and a leakage inductance Lr1 of the transformer 12. At time t3, the diode D2 enters a conductive state when the voltage Vds2 becomes zero. On the secondary side, the capacitor Cs is discharged and the diode Ds enters a conductive state when the voltage Vs becomes zero.

(3) State 3 [t3 to t4]

When the diode D2 enters a conductive state, the switching element Q2 is turned on and Zero Voltage Switching (ZVS) operation is performed. The characteristic impedance of a resonance circuit formed of the leakage inductances Lr1 and Lr2 and the capacitor Cr is set to be sufficiently small and the current id2 is a resonance current that increases substantially linearly. Magnetically excited energy is discharged from the secondary side and the current is flowing through the diode Ds has a waveform similar to one obtained by adding the resonance current id2 to the linearly decreasing magnetically excited current im. At time t4, the resonance current id2 approaches its peak value and the switching element Q2 is turned off.

(4) State 4 [t4 to t5]

When the switching element Q2 is turned off, the resonance current id2 is suddenly cut off. As a result of the current flowing due to the leakage inductance Lr1, the capacitor Cds1 is discharged and the capacitor Cds2 is charged. At time t5, the diode D1 enters a conductive state when the voltage Vds1 becomes zero.

(5) State 5 [t5 to t6]

When the diode D1 enters a conductive state, the switching element Q1 is turned on and ZVS operation is performed. The current id1, which rapidly increases, becomes equal to the magnetically excited current at time t6.

(6) State 6 [t6 to t7]

When the current id1 becomes equal to the magnetically excited current, a reverse recovery time of the diode Ds is entered. During a storage time, the reverse current increases, and during a transition time, the capacitor Cs is charged and the reverse current decreases. The diode Ds enters a non-conductive state after the reverse recovery time and the state once again becomes State 1.

Then, the operations in States 1 to 6 are periodically repeated.

Figure 3A:
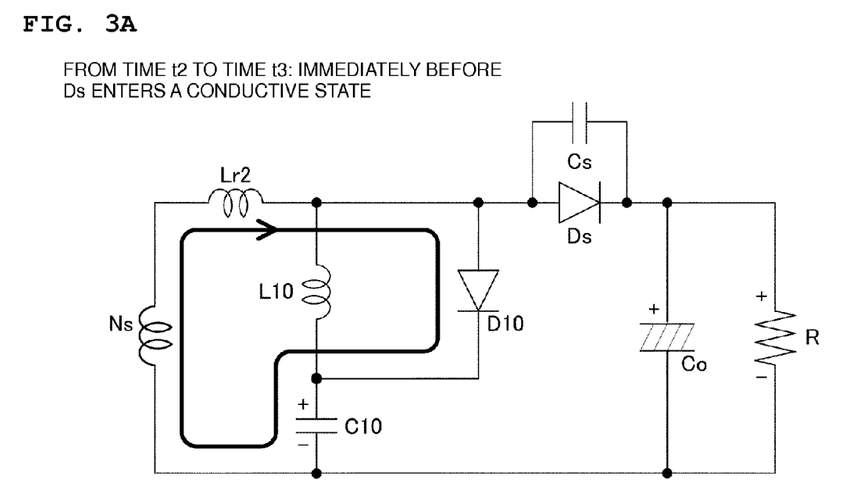
FIG. 3A is an illustrative diagram illustrating an example of the flow of current immediately before the rectifier diode Ds transitions to a conductive state and FIG. 3B is an illustrative diagram illustrating an example of the flow of current immediately after the rectifier diode Ds has transitioned to a non-conductive state.

Referring to FIG. 3A, in a time period from time t2 to time t3, immediately before the diode Ds enters a conductive state, a conduction path is established by the secondary winding Ns, the rectifier diode D10 and the capacitor C10. Charge arising from the magnetically excited energy accumulated in the transformer 12, is accumulated in the capacitor C10 via the rectifier diode D10. As a result, one end of the capacitor C10 is positively electrified and the other end of the capacitor C10 is negatively electrified.

Figure 3B:
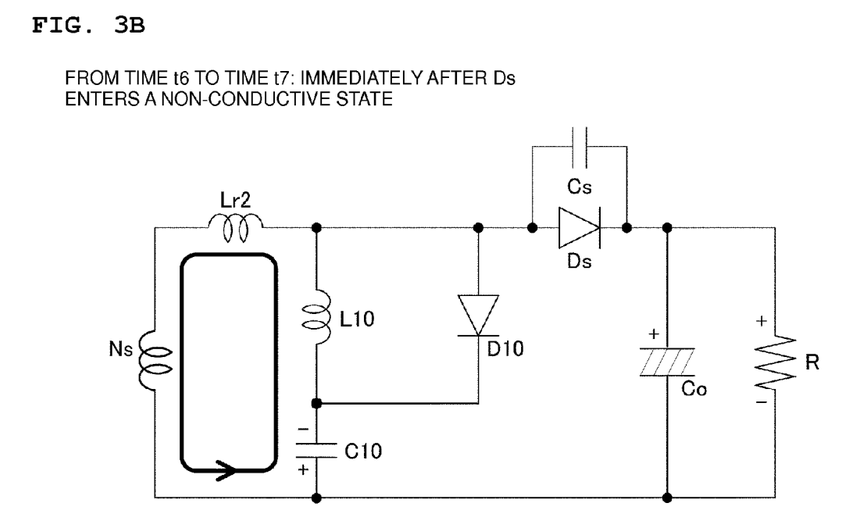

Referring to FIG. 3B, in the time period from time t6 to time t7, immediately after the diode Ds enters a non-conductive state, a conduction path is established by the secondary winding Ns, the inductor L10 and the capacitor C10. As a result, charge accumulated in the capacitor C10 is discharged and charge is once again accumulated in the capacitor C10 in the reverse direction. In other words, one end of the capacitor C10 is negatively electrified and another end of the capacitor C10 is positively electrified.

Figure 2H:
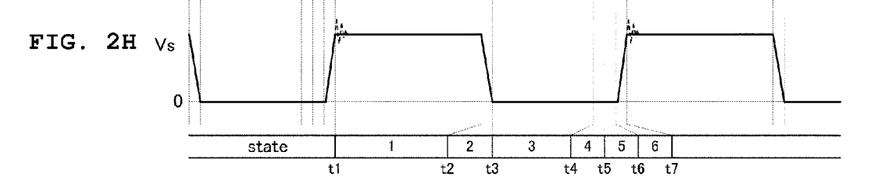

As illustrated by the broken lines on the voltage Vs of the diode Ds in FIG. 2H, if there were no rectifier diode D10, capacitor C10 and inductor L10, a surge voltage would be generated after time t1 and time t7 across the two ends of the rectifier diode Ds. As illustrated in FIG. 3B, this surge voltage is suppressed by the capacitor C10 accumulating charge in the reverse direction in the closed loop defined by the secondary winding Ns and the inductor L10. In addition, the charge accumulated by the capacitor C10 is discharged in the period from time t2 to time t3 via the closed loop defined by the capacitor C10, the secondary winding Ns, and the diode D10 as illustrated in FIG. 3A, and one end of the capacitor C10 is positively electrified and the other end of the capacitor C10 is negatively electrified. Thus, the surge voltage can be suppressed while reducing electrical power loss.

According to this preferred embodiment, when the polarity of the voltage excited in the secondary winding Ns is inverted to a positive polarity from a negative polarity, the rectifier diode Ds transitions to a conductive state from a non-conductive state. In contrast, when the polarity of the voltage excited in the secondary winding Ns is inverted to a negative polarity from a positive polarity, the rectifier diode Ds transitions to a non-conductive state from a conductive state. At this time, the leakage inductance Lr2 and the capacitor Cs resonate with each other and a surge voltage appears across the two ends of the rectifier diode Ds in the period immediately after the rectifier diode Ds transitions to a non-conductive state from a conductive state.

As a result, when the rectifier diode Ds transitions from a non-conductive state to a conductive state, a conduction path is defined by a closed loop including the secondary winding Ns, the rectifier diode D10 and the capacitor C10. As a result, in the period immediately before the rectifier diode Ds transitions to a conductive state, charge is accumulated in the capacitor C10.

In addition, when the rectifier diode Ds transitions from a conductive state to a non-conductive state, a conduction path is defined by the secondary winding Ns, a resistance and/or an inductive impedance, and the capacitor C10. The charge accumulated in the capacitor C10 is discharged in the period immediately after the rectifier diode Ds transitions to a non-conductive state, a portion of the discharged charge is consumed by the resistance and/or inductive impedance in order to suppress the surge voltage, and charge is once again accumulated in the capacitor C10 in the reverse direction.

The surge voltage is suppressed by the accumulation of charge in the capacitor C10 and the charge is discharged from the capacitor C10 during the dead time period such that electrical power loss is reduced.

Although a portion of the charge discharged from the capacitor C10 is consumed in order to suppress the surge voltage, the rest of the charge discharged from the capacitor C10 is once again accumulated in the capacitor C10 in a state where the polarity of the voltage has been reversed, and thereby the surge voltage can be suppressed while reducing electrical power loss.

Figure 4A:
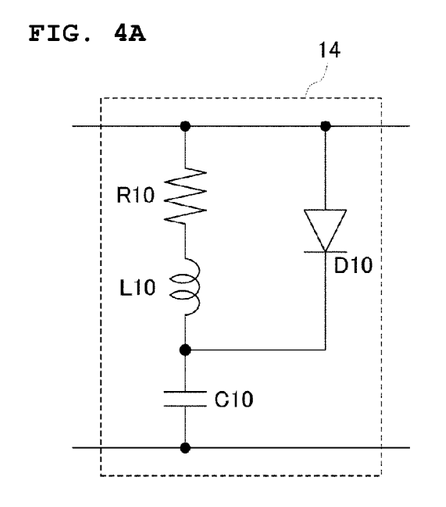
FIG. 4A is a circuit diagram illustrating another example of a configuration of a snubber circuit that is applied to the preferred embodiment of FIG. 1.
Figure 4B:
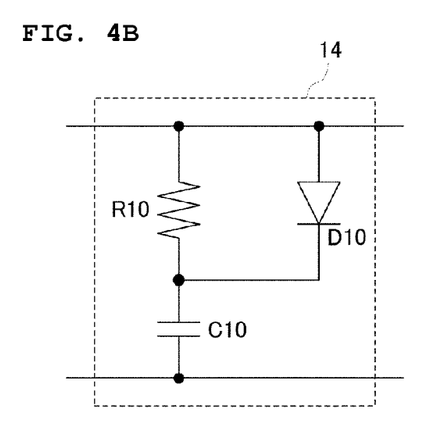
FIG. 4B is a circuit diagram illustrating yet another example of a configuration of a snubber circuit applied to the preferred embodiment of FIG. 1.

In addition, in this preferred embodiment, it is assumed that the inductance L10 is provided as an element connected in parallel with the rectifier diode D10 in the snubber circuit 14, but a configuration may be instead adopted in which, instead of or in addition to the inductor L10, a resistance R10 is connected in parallel with the rectifier diode D10 (refer to FIG. 4A and FIG. 4B).

Figure 4C:
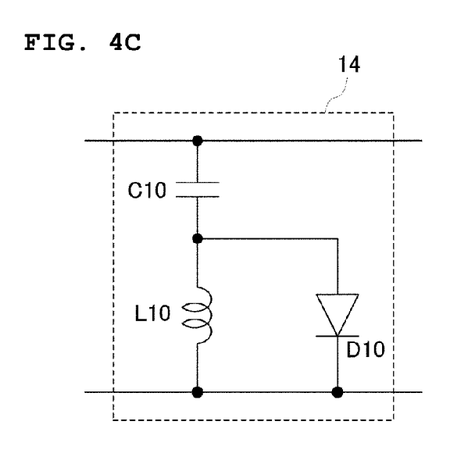
FIG. 4C is a circuit diagram illustrating still yet another example of a configuration of a snubber circuit applied to the preferred embodiment of FIG. 1.

In addition, in this preferred embodiment, the anode and the cathode of the rectifier diode D10 are respectively connected to one end of the secondary winding Ns and one end of the capacitor C10, and the other end of the capacitor C10 is connected to the other end of the secondary winding Ns. However, a configuration may be instead adopted in which the one end of the capacitor C10 is connected to the one end of the secondary winding Ns and the anode and the cathode of the rectifier diode D10 are respectively connected to the other end of the capacitor C10 and the other end of the secondary winding Ns (refer to FIG. 4C).

Figure 5:
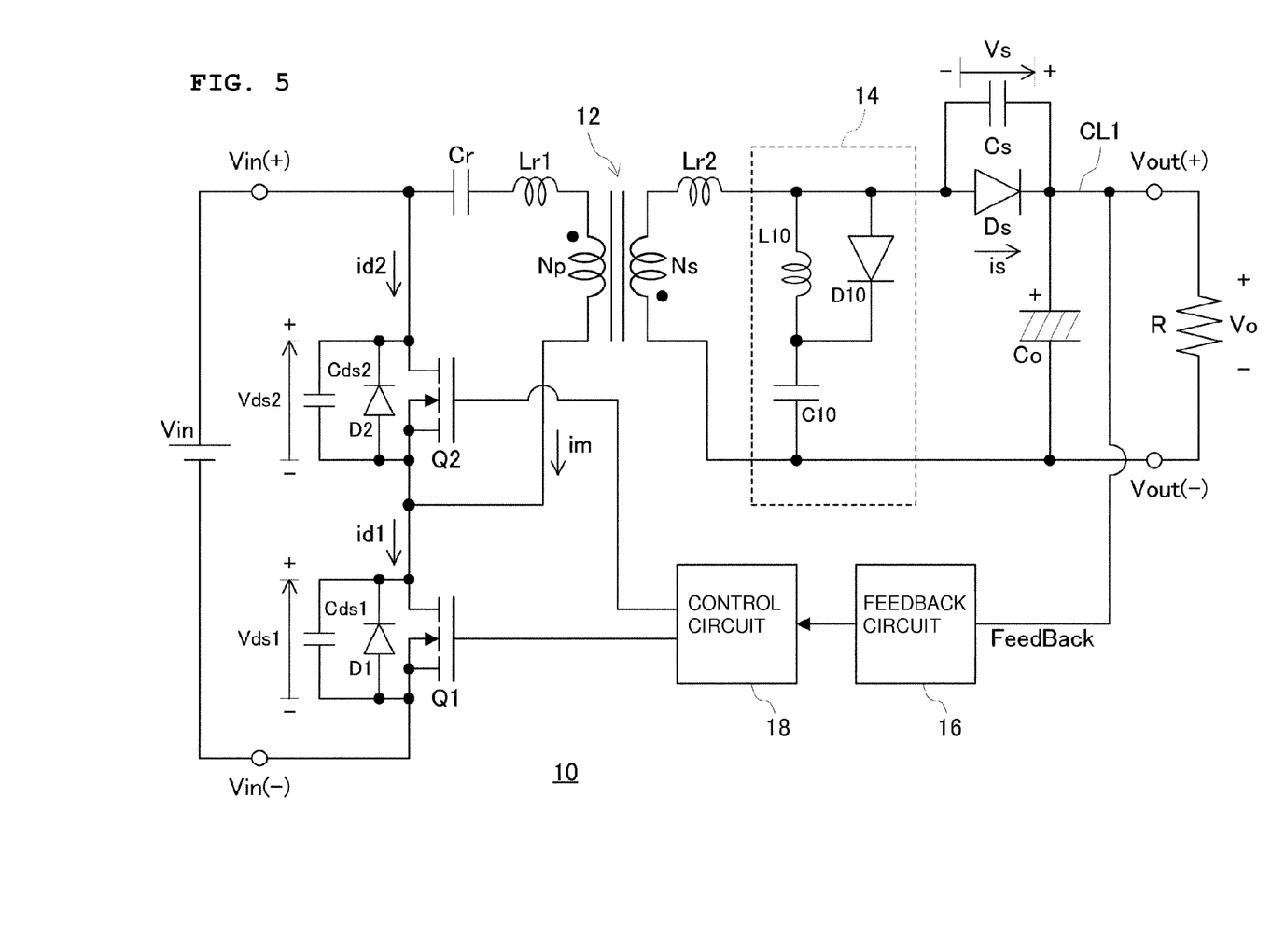
FIG. 5 is a block diagram illustrating a configuration of another preferred embodiment of the present invention.

FIG. 5 is a block diagram illustrating a configuration of another preferred embodiment of the present invention. This configuration is different from that of the switching power supply apparatus 10 of the preferred embodiment of FIG. 1 in terms of the position of the resonance capacitor Cr. The resonance capacitor Cr is inserted into a path along which a current flows when either of the switching element Q1 and the switching element Q2 is turned on. The resonance capacitor Cr may also be connected in this way.

Figure 6:
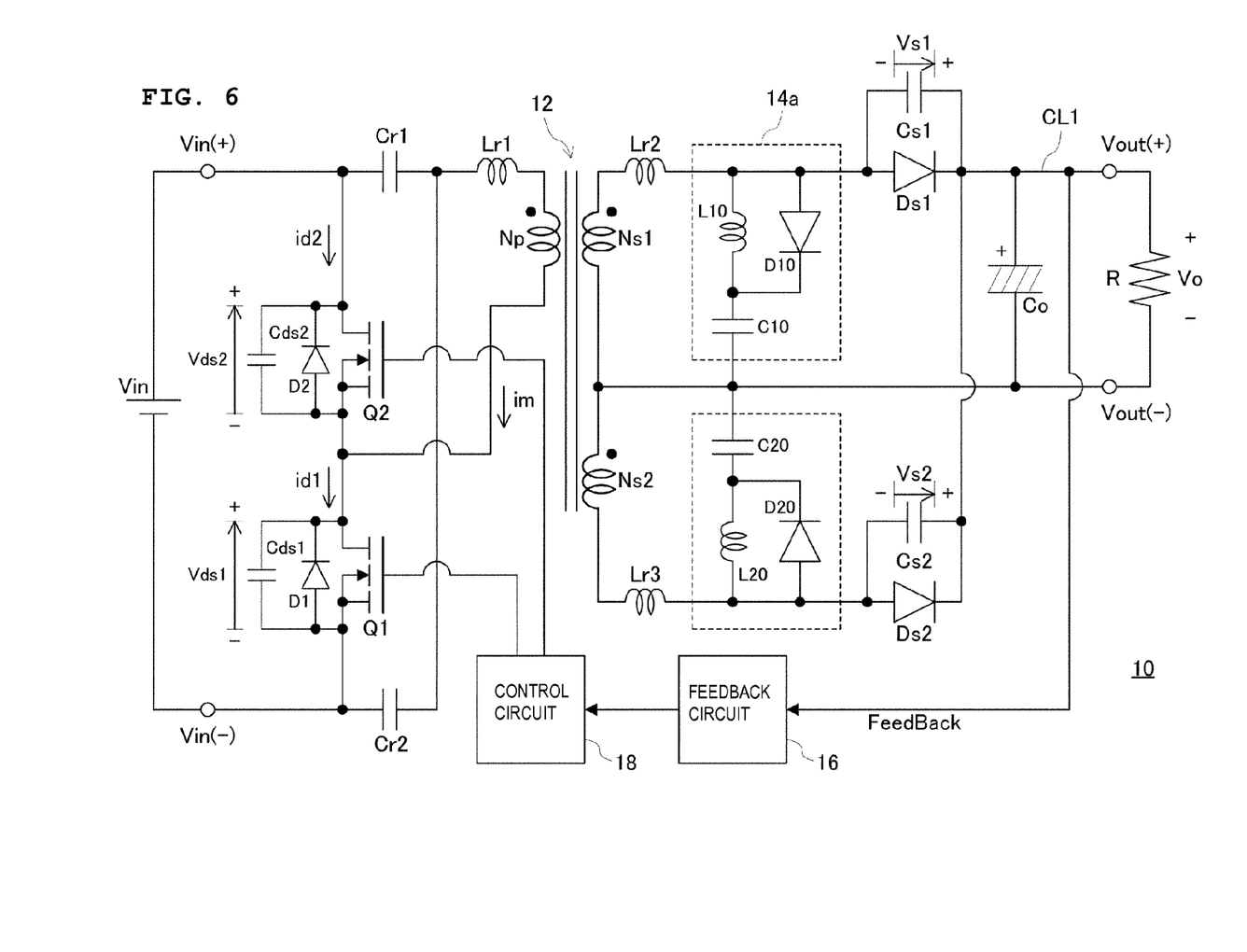
FIG. 6 is a block diagram illustrating a configuration of yet another preferred embodiment of the present invention.

FIG. 6 is a block diagram illustrating the configuration of another preferred embodiment of the present invention. This configuration is different from that of switching power supply apparatus 10 of the preferred embodiment of FIG. 1 in that the primary side is arranged as a half-bridge circuit. An output is taken out from the secondary winding by full wave rectification using a center tap. The snubber circuit 14a of this preferred embodiment of the present invention includes pairs of rectifier diodes D10, D20, inductors L10, L20, and capacitors C10, C20 connected to respective ones of two secondary winding Ns1, Ns2 which are in turn connected to full wave rectification diodes Ds1, Ds2 with respective voltages Vs1, Vs2. Thus, the primary side may have a half bridge configuration.

Figure 7:
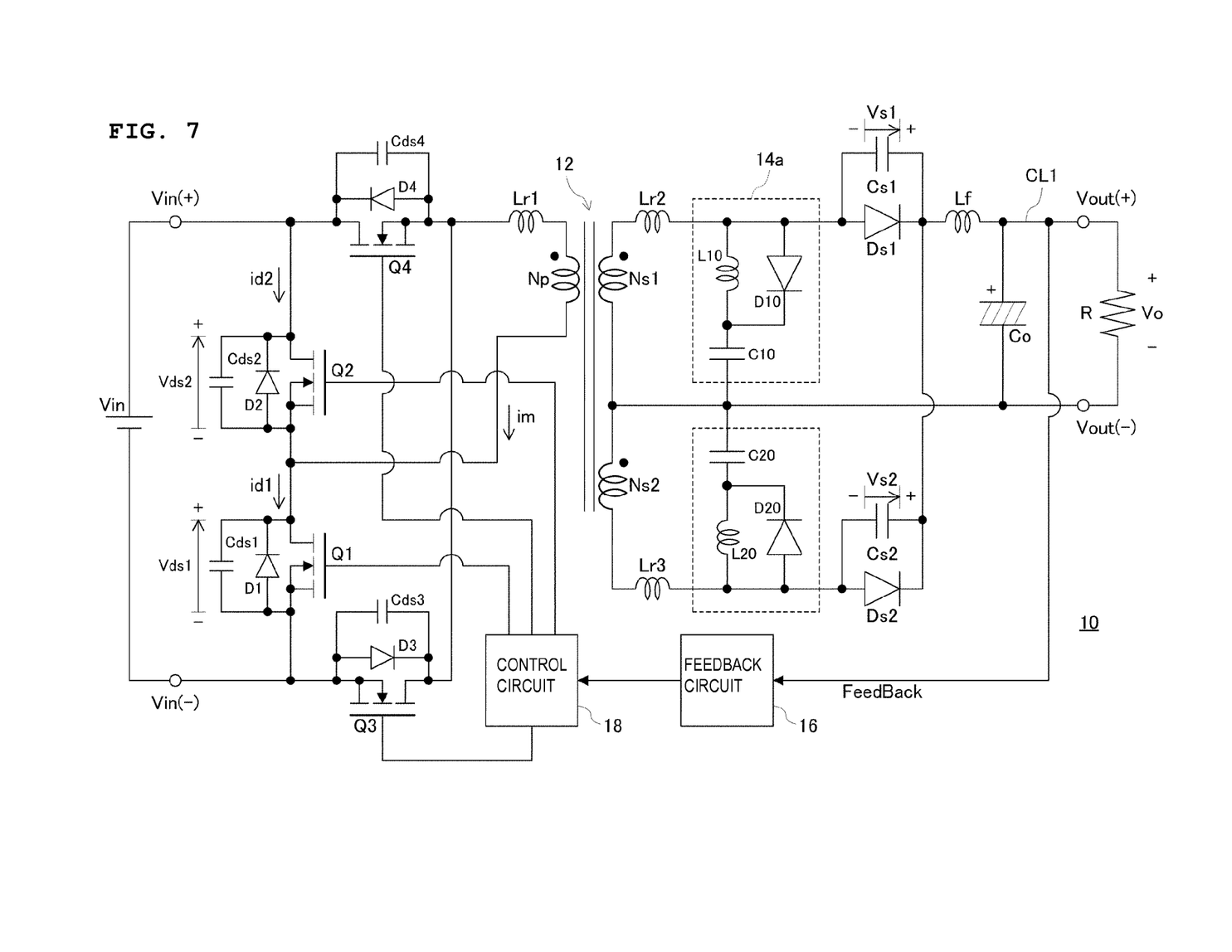
FIG. 7 is a block diagram illustrating a configuration of still yet another preferred embodiment of the present invention.

FIG. 7 is a block diagram illustrating the configuration of another preferred embodiment of the present invention and this configuration is different from that of switching power supply apparatus 10 of the preferred embodiment of FIG. 1 in that the primary side is arranged as a full-bridge circuit. Similarly to the above-mentioned half-bridge circuit of the preferred embodiment of FIG. 6, output is taken out from the secondary side by full wave rectification by using a center tap, and a smoothing inductor Lf is connected upstream of a smoothing capacitor Co. Thus, the primary side may have a full bridge configuration by including additional switching elements Q3, Q4 with corresponding capacitors Cds3, Cds4 and diodes D3, D4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
a transformer including a primary winding and a secondary winding;
a switching unit that repeatedly inverts a voltage applied to the primary winding;
a conduction path that supplies a voltage excited in the secondary winding due to operation of the switching unit to a load that is connected between a high-potential side and a ground side of the secondary winding; and
a first rectifier element that has a rectification direction extending from a high-potential side toward a ground side of the load and that is provided along the conduction path; wherein
a second rectifier element and a first capacitor, which are connected in series with each other, are connected in parallel with the secondary winding;
the second rectifier element has a rectification direction extending from the high-potential side toward the ground side;
a resistance and/or an inductive impedance is connected in parallel with the second rectifier element;
a charge accumulated in the first capacitor is discharged in a period after the first rectifier element transitions to a non-conductive state from a conductive state;
a portion of the charge discharged from the first capacitor is consumed by the resistance and/or the inductive impedance in order to suppress a surge voltage; and
another portion of the charge discharged from the first capacitor is once again accumulated in the first capacitor in a reverse direction.

2. The switching power supply apparatus according to claim 1, wherein the switching unit includes a first switching element connected in series with the primary winding, a second switching element and a first capacitor, which define a series circuit connected in parallel with the primary winding, and a control unit that turns the first switching element and the second switching element on and off in a complimentary manner with a dead time between on periods of the first and second switching elements.

3. The switching power supply apparatus according to claim 2, wherein the control unit turns on and off the first switching element and/or the second switching element using a Zero Voltage Switching scheme.

4. The switching power supply apparatus according to claim 2, wherein the control unit adopts a continuous current mode in which a current flowing to the transformer is continuous.

5. The switching power supply apparatus according to claim 1, wherein the switching unit includes a first switching element connected in series with the primary winding, a second switching element connected in parallel with the primary winding, and a control unit that turns the first switching element and the second switching element on and off in a complimentary manner with a dead time between on periods of the first and second switching elements.

6. The switching power supply apparatus according to claim 5, wherein the switching unit further includes a third switching element connected in series with the primary winding and a fourth switching element connected in parallel with the primary winding;
the first switching element, second switching element, third switching element, and fourth switching element define a full bridge configuration; and
the control unit turns the first switching element, second switching element, third switching element, and fourth switching element on and off in a complimentary manner with a dead time between on periods of the first, second, third, and fourth switching elements.

7. The switching power supply apparatus according to claim 6, further comprising:
an additional secondary wiring; wherein
a third rectifier element and a second capacitor, which are connected in series with each other, are connected in parallel with the additional secondary winding;
the third rectifier element has a rectification direction extending from the high-potential side toward the ground side; and
an additional resistance and/or an additional inductive impedance is connected in parallel with the third rectifier element.

8. The switching power supply apparatus according to claim 7, further comprising a smoothing capacitor connected in parallel with the secondary winding.

9. The switching power supply apparatus according to claim 8, further comprising a smoothing inductor connected upstream of the smoothing capacitor.

10. The switching power supply apparatus according to claim 1, wherein the inductive impedance is defined by a ferrite bead.

11. The switching power supply apparatus according to claim 1, wherein the inductive impedance is defined by an amorphous bead.

12. The switching power supply apparatus according to claim 1, wherein the transformer adopts a flyback scheme.

13. The switching power supply apparatus according to claim 1, wherein the transformer adopts a forward scheme.

14. The switching power supply apparatus according to claim 1, wherein the first rectifier element is a Field Effect Transistor.

15. The switching power supply apparatus according to claim 1, further comprising a smoothing capacitor connected in parallel with the secondary winding.

16. The switching power supply apparatus according to claim 15, further comprising a smoothing inductor connected upstream of the smoothing capacitor.

17. The switching power supply apparatus according to claim 1, further comprising:
an additional secondary wiring; wherein
a third rectifier element and a second capacitor, which are connected in series with each other, are connected in parallel with the additional secondary winding;
the third rectifier element has a rectification direction extending from the high-potential side toward the ground side; and
an additional resistance and/or an additional inductive impedance is connected in parallel with the third rectifier element.

18. The switching power supply apparatus according to claim 17, further comprising a smoothing capacitor connected in parallel with the secondary winding.

19. A switching power supply apparatus comprising:
a transformer including a primary winding and a secondary winding;

a switching unit that repeatedly inverts a voltage applied to the primary winding;

a conduction path that supplies a voltage excited in the secondary winding due to operation of the switching unit to a load that is connected between a high-potential side and a ground side of the secondary winding; and a first rectifier element that has a rectification direction extending from a high-potential side toward a ground side of the load and that is provided along the conduction path; wherein a second rectifier element and a first capacitor, which are connected in series with each other, are connected in parallel with the secondary winding;

the second rectifier element has a rectification direction extending from the high-potential side toward the ground side; and a resistance and an inductive impedance are connected in parallel with the second rectifier element;

a charge accumulated in the first capacitor is discharged in a period after the first rectifier element transitions to a non-conductive state from a conductive state;

a portion of the charge discharged from the first capacitor is consumed by the resistance and/or the inductive impedance in order to suppress a surge voltage; and another portion of the charge discharged from the first capacitor is once again accumulated in the first capacitor in a reverse direction.

20. The switching power supply apparatus according to claim 19, further comprising a smoothing capacitor connected in parallel with the secondary winding.

\* \* \* \* \*